P. FARUP.
PROCESS FOR THE DESTRUCTIVE DISTILLATION OF COAL AND OTHER MATERIAL.
APPLICATION FILED NOV. 4, 1920.
1,414,401. Patented May 2, 1922.
2 SHEETS—SHEET 1.
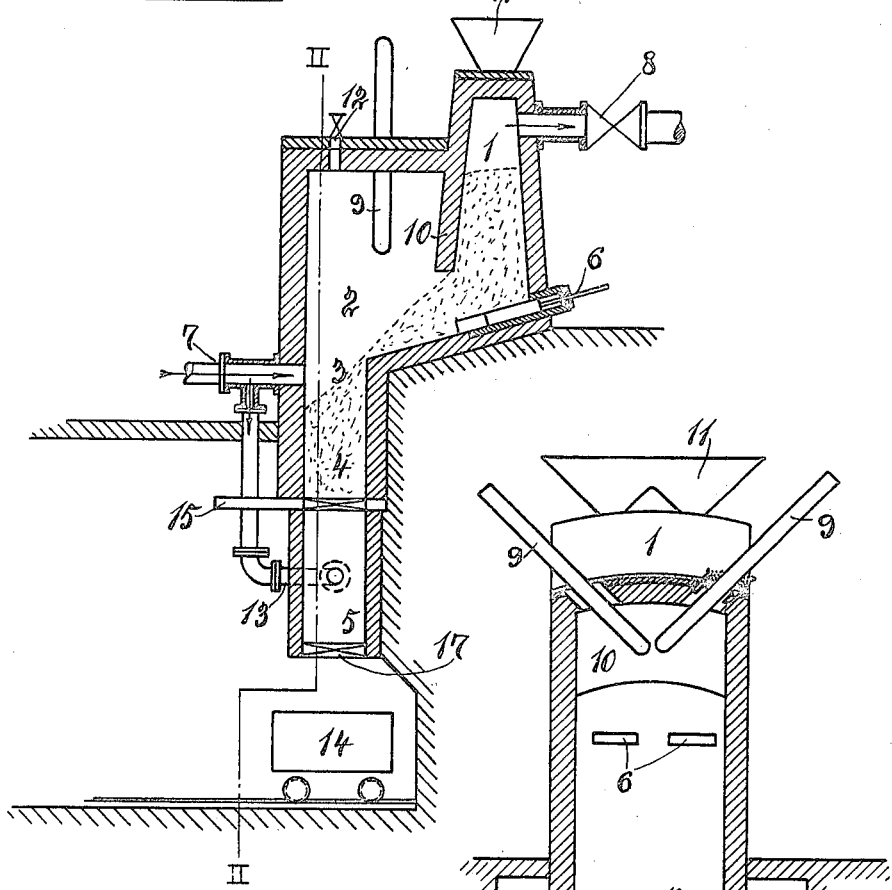
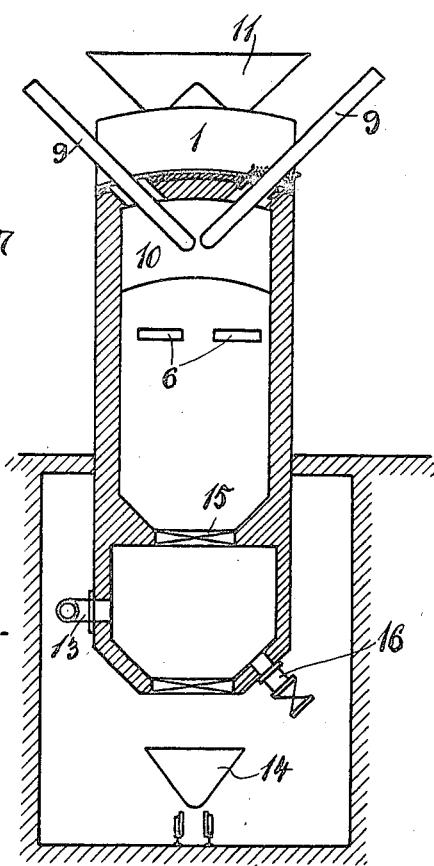

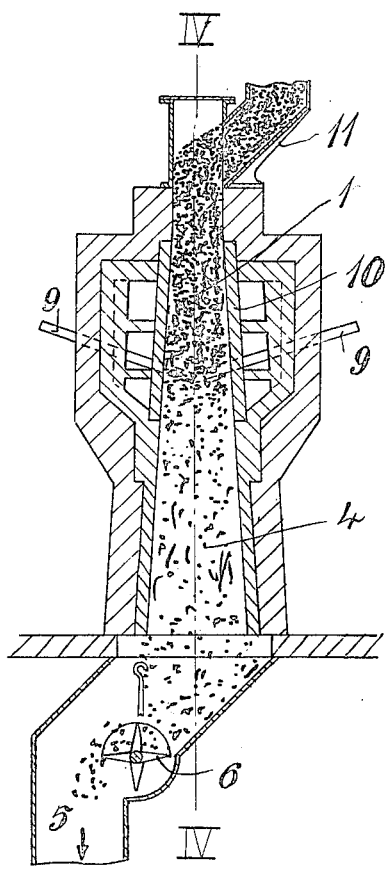
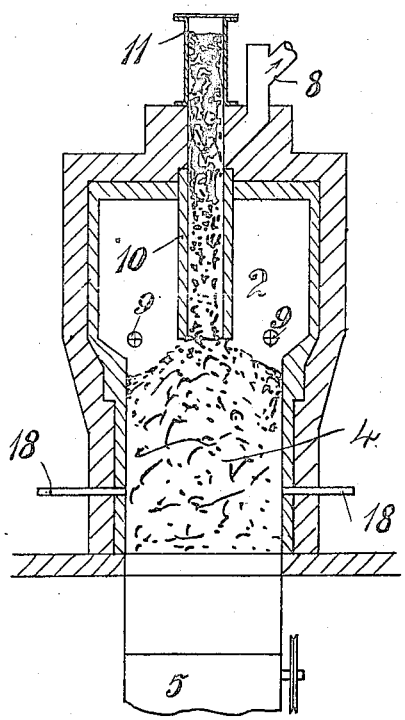

UNITED STATES PATENT OFFICE.

PEDER FARUP, OF SLEMDAL, NEAR CHRISTIANIA, NORWAY.

PROCESS FOR THE DESTRUCTIVE DISTILLATION OF COAL AND OTHER MATERIAL.

1,414,401.          Specification of Letters Patent.      Patented May 2, 1922.

Application filed November 4, 1920. Serial No. 421,746.

*To all whom it may concern:*

Be it known that I, PEDER FARUP, a subject of the King of Norway, residing at Slemdal, near Christiania, Norway, have invented certain new and useful Improvements in Processes for the Destructive Distillation of Coal and Other Material, (for which I have filed applications in Norway, #13,055, March 27, 1918, and #21,621, Aug. 27, 1920, in combination;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the destructive distillation of coal and other materials.

As is known it is an important object in the coking and illuminating gas industry to attain a gas of a high calorific value as well as a sufficiently thorough coking.

Various difficulties are, however, encountered in the attempts to attain these results. Thus, in the usually employed coal-fired horizontal or vertical retorts it cannot be avoided that a considerable proportion of the gas passes through highly heated parts of the retort space, which results in a decomposition of hydrocabons, separation of carbon taking place and the value of the gases being reduced.

According to the present invention a considerable improvement of the conditions is attained.

A characteristic feature of the invention consists in the combination of direct and indirect electrical heating of the material to be decomposed, indirect heating of the material being succeeded by a direct and intensive heating. In the indirect heating stage the bulk of the gas is distilled off at a comparatively low temperature without passing through more strongly heated spaces.

This method of destructive distillation is suitably carried into effect in an apparatus comprising an indirectly heated distillation chamber which opens into a directly heated distillation chamber in combination with means whereby the material to be decomposed is caused to pass through the indirectly heated chamber and then through the directly heated chamber.

The gaseous distillation products from the direct heating chamber are caused to leave the apparatus wholly or in part through the indirect heating chamber, giving off its heat to the material contained therein.

The indirect heating chamber may suitably consist of one or more vertical or inclined shafts which open at their lower end into an electrically heated chamber, so that the material which is introduced into the shaft or shafts at the top descends by its own weight through the shaft and is discharged into the direct heating chamber where the final decomposition takes place. The indirect heating chambers may be so arranged as to be wholly or in part surrounded by the direct heating chamber or this latter may be wholly or in part surrounded by the indirect heating chamber. The chambers may also be arranged beside one another so as to have only one side wall or a portion thereof in common.

The invention will be readily understood by reference to the accompanying drawing, in which—

Fig. 1 is a vertical sectional view of an apparatus which may be employed to carry the invention into effect, Fig. 2 is a vertical sectional view on the line II—II of Fig. 1, Fig. 3 is a vertical sectional view of another embodiment of the invention, Fig. 4 is a vertical sectional view on the line IV—IV of Fig. 3.

In the example illustrated in Figs. 1 and 2 the indirect heating chamber 1 is in the form of a vertical shaft. 2 is the direct heating chamber into which the shaft 1 opens. The direct heating chamber 2 communicates with a collecting chamber 4 through an opening 3. 5 is a discharging chamber which is closed at the top as well as at the bottom by gas-tight dampers. The apparatus is heated by means of an electric arc between electrodes 9. The coal or other material to be decomposed is charged into the shaft 1 through the hopper 11 and descends through the shaft in proportion as material is moved from the lower end of the charge into the chamber 2 by means of the rake or plunger 6. From the chamber 2 the material falls down into the collection chamber 4. When the damper 15 is opened the material falls down into the chamber 5 from which it can be removed by opening the damper 17. By this arrangement it is made possible to remove the material remaining after the distillation from the chamber 4 without allowing air to enter the furnace. The chamber 5 is provided with inlet 13 and outlet 16 for gas so as to allow of blowing gas therethrough and thus removing air, which may be contained therein. Another gas inlet is provided at 7 to allow of introducing a non-sooting gas into the furnace. The decomposition and distillation takes place to the greater part while the material is still in the shaft 1 and is completed under the direct action of radiant heat when it reaches the chamber 2.

It will be understood that in the shaft 1 heat is transmitted to the material partly through the partition wall 10 and partly by means of the hot gaseous distillation products which pass through the shaft and into the outlet pipe 8.

The bulk of the gaseous distillation products will pass through the shaft without entering the direct heating chamber or into contact with the electrodes. If special measures are not taken, it cannot be avoided however, that a proportion of the gas is subjected to the action of the higher temperature of the direct heating chamber and the resulting separation of carbon will impair the continuous and uniform operation. To prevent to a sufficient degree the escape of gaseous distillation products (illuminating gas) into the direct heating space it has been found of advantage to introduce a non-sooting gas either into the collecting chamber or into the direct heating chamber. By this arrangement it is attained also to promote the uniform heating in the shaft or shafts and the (illuminating) gas is conveyed rapidly and with a low temperature out to be cooled, so that only a very small proportion of hydrocarbons will be decomposed and consequently the gas as well as the tar will obtain a very valuable composition.

For this purpose various non-sooting gases or gas mixtures may be employed depending upon the local conditions and the results to be attained.

If the illuminating gas is used for reduction purposes the waste gases from the reduction furnace may be used. Or steam, water-gas, producer-gas, or one or more of the constituents of such gases may be used.

In the instance that water vapour or carbon dioxide is employed a reduction will take place, hydrogen or carbon-monoxide being produced. In the coking of peat the gas rich in water and carbonic acid derived from a previous carbonizing operation may, for instance, be employed.

By this means it is also attained to utilize the heat contained in the hot coke, so that the heat is advantageously utilized in the said heat consuming processes and effects an increase in the resulting quantity of gas.

In this instance it may of course be of advantage to introduce the gases into the coke chamber. It may also be of advantage instead of water vapour to supply liquid water to the hot coke.

In large plants a number of furnaces of the described construction may be combined and united, in which case one shaft (indirect heating chamber) will be arranged on each side of the electrical heating means or a number of shafts may be placed in a common direct heating chamber with electrical heating means on both sides of each shaft.

In the embodiment of the invention illustrated in Figs. 3 and 4 the indirect heating chamber consists of a shaft 1 which is enclosed in the direct heating chamber 2, electrical heating means being arranged on both sides of the shaft.

When a number of the furnaces are united in the manner described in connection with Figs. 1 and 2 the electrical heating means will be interposed between the shafts. Water or other liquid or gaseous substance may be introduced at 18.

As a matter of course the details of the carbonizing apparatus may be modified within wide limits without departing from the fundamental principle of this invention. Thus the invention is not limited to the use of the electrical heating means as illustrated in the drawing, any other electrical heating means may be employed and the position of the electrical heating means may be varied between wide limits.

The direct as well as the indirect heating chamber may be given any desired form. Thus instead of arranging the shafts vertical they may be placed in a more or less inclined position.

Claims:

1. Process for the destructive distillation of coal and other materials, which comprises partially destructively distilling said material by indirect radiated electrical heating and continuing the destructive distillation of said material by direct heating.

2. Process according to claim 1 in which the material to be decomposed during the indirect heating stage is separated from the electrical source of heat by an interposed body of stable material.

3. Process according to claim 1 in which the material is caused to progress through an indirect heating chamber and then through a direct heating chamber in which the decomposition is completed.

4. Apparatus for the destructive distillation of materials comprising an indirectly heated distillation shaft heated by radiated heat and opening into and surrounded by a directly heated distillation chamber, and electrical means for effecting the heating of said shaft and chamber.

5. Apparatus for the destructive distillation of material comprising a direct heating chamber, an indirect heating chamber discharging into said direct heating chamber, a collecting chamber receiving the material from said direct heating chamber, a discharging chamber communicating with said collecting chamber, means for introducing fluids into said collecting chamber, and means for introducing fluids into said discharging chamber.

6. Process according to claim 1 in which a substance which is of a gaseous condition at the temperature at which the destructive distillation takes place is introduced into the space containing hot carbonized material.

7. Process for the destructive distillation of material by electrical heating in which the material is caused to progress through an indirect heating chamber and then through a direct heating chamber a gas different from that resulting by the distillation being introduced into the direct heating chamber.

8. Process according to claim 1 in which the fluid products of distillation in said direct heating chamber are passed through the material in the indirect heating chamber.

In testimony that I claim the foregoing as my invention, I have signed my name in presence of two subscribing witnesses.

PEDER FARUP.

Witnesses:
A. B. COOK,
M. W. RAHRS.